Feb. 9, 1971 B. G. BOYD 3,562,058

METHOD FOR BREAKING AND SEPARATING SUBSTRATE MATERIAL

Filed May 16, 1967 2 Sheets-Sheet 1

INVENTOR

Bobby Gene Boyd

BY John E. Vandigriff

ATTORNEY

METHOD FOR BREAKING AND SEPARATING SUBSTRATE MATERIAL

Filed May 16, 1967 2 Sheets-Sheet 2

United States Patent Office 3,562,058

Patented Feb. 9, 1971

3,562,058
METHOD FOR BREAKING AND SEPARATING SUBSTRATE MATERIAL

Bobby Gene Boyd, Garland, Tex., assignor to Texas Instruments Incorporated, Dallas, Tex., a corporation of Delaware Filed May 16, 1967, Ser. No. 638,910
Int. Cl. B01j *17/00;* H01l *5/00;* H01r *39/00*
U.S. Cl. 156—300 10 Claims

ABSTRACT OF THE DISCLOSURE

Disclosed is a method for maintaining the original orientation of the segments of a broken substrate of material by vacuum packaging the substrate before breaking it into segments and then removing a portion of the vacuum package prior to vacuum forming the remaining portion of the package to cause the segments to be separated.

This invention relates to a method for separating the segments of a substrate of a material which has been broken into discrete regions and is particularly applicable to the semiconductor art for separating the segments of a semiconductor wafer which has been scribed and broken while maintaining the orientation of the individual segments.

In manufacturing transistors, it is a common practice to form a large number of components or circuits on a single slice of semiconductor material. It is then necessary to break the slice into discrete sections in order to separate the individually formed elements. One method of breaking the slice to insure that the break does not extend through the formed elements, is to scribe lines in between the elements. The slice is then broken into separate segments with one or more devices or circuits on each segment.

In co-pending U.S. patent application, Ser. No. 638,903, entitled "Method for Breaking Semiconductor Wafers" filed concurrently with the present application, a novel method is described and claimed for breaking and separating a semiconductor slice while maintaining the orientation of the individual segments. According to that invention a semiconductor wafer or slice is encapsulated between two sheets of heat sensitive impervious material. After the wafer is broken into the individual segments, the vacuum package is heated and stretched to separate the individual segments but maintain the orientation thereof.

It is the object of this invention, however, to provide a novel and improved method by which a semiconductor wafer is vacuum packed, the wafer broken and then the package opened before the individual elements are separated by vacuum forming while maintaining the orientation of the elements.

It is another object of the invention to provide a method for separating individual elements of a semiconductor wafer by adhering the segments to one layer of a heat sensitive material.

In accordance with these and other objects the present invention involves the method of breaking and separating elements of a semiconductor wafer by first vacuum sealing the semiconductor wafer between two sheets of pliable heat sensitive impervious material. The packaged semiconductor wafer is then placed under a roller which breaks the individual segments along the scribe lines, the vacuum sealing holding the individual segments in proper orientation. Thereafter the broken segments within the vacuum package are placed within a heat press to form indentations in one of the pliable sheets of heat sensitive material and to cause the semiconductor elements to adhere thereto. The vacuum package is then placed in a vacuum mold and one sheet of the soft pliable material removed. Thereafter the remaining sheet is vacuum formed to separate the individual segments while maintaining the original orientation thereof.

The invention itself, however, as well as other objects, features and advantages thereof may best be understood by reference to the following detailed description read in conjunction with the accompanying drawings wherein.

Figures 1, 2, 3, 4:
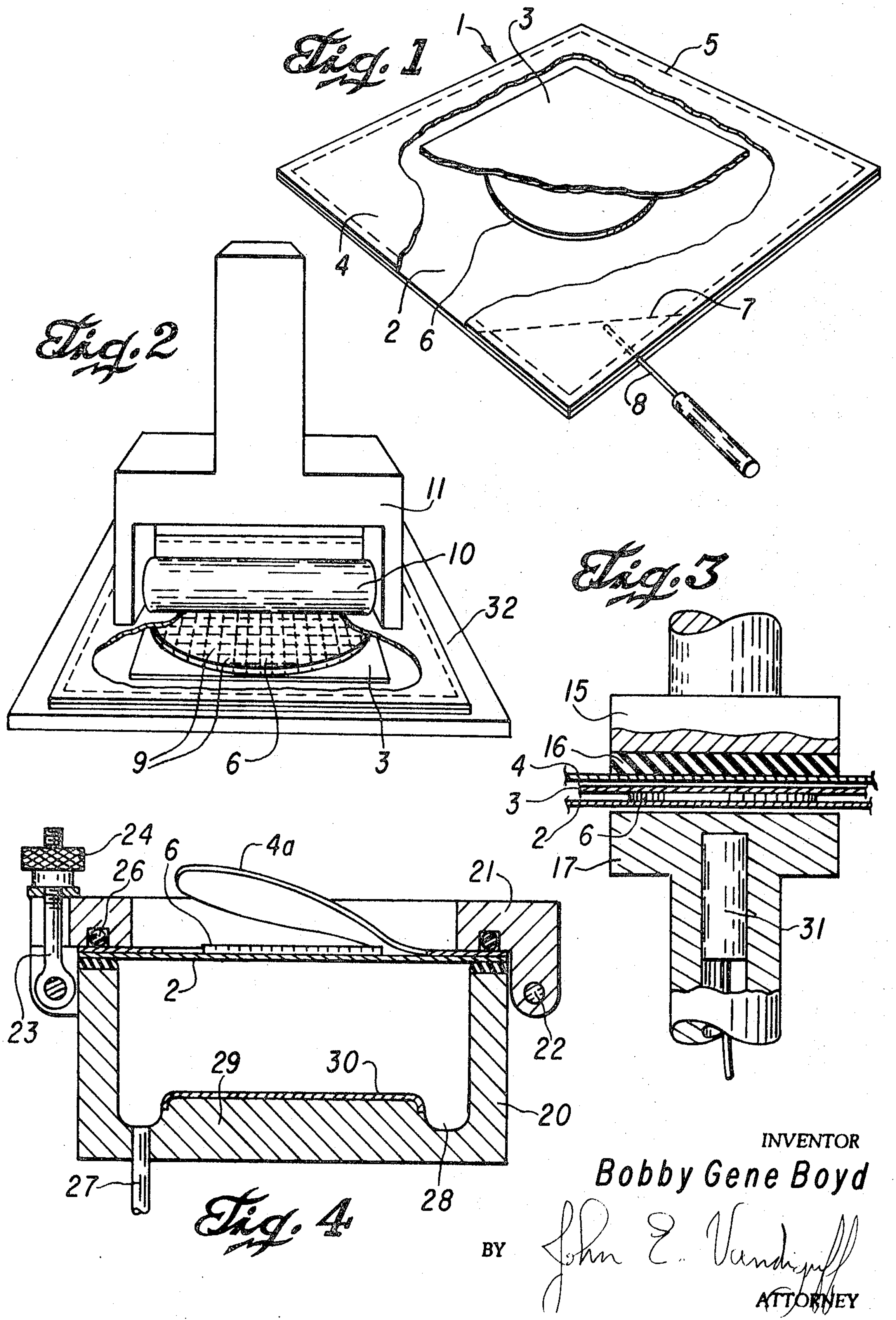
FIG. 1 shows a semiconductor wafer package between two sheets of pliable material and a portion of the package removed to expose the wafer.
FIG. 2 shows a roller mechanism for breaking the packaged wafer along scribe lines.
FIG. 3 is a cross-sectional view of a heat press used to seal the individual semiconductor elements into indentations formed in one sheet of the soft pliable material.
FIG. 4 shows the packaged broken wafer on a vacuum forming apparatus with the package open and one portion thereof removed.

In order to break a wafer and separate it into segments it is necessary to place the unbroken scribed wafer 6 in a package 1 and form a vacuum therein. Such a package is shown in FIG. 1 wherein the wafer 6 is placed device side up on a plastic film 2. A thin film 3 of high temperature material, for example, a metal foil or plastic film, is placed over the face of the wafer and a second layer 4 of plastic material is placed over the thin film 3 and then sealed with layer 2 around the edge at 5. To vacuum seal the package, a vacuum needle 8 is inserted into the package between layers 2 and 4 and a vacuum drawn. The needle 8 is then withdrawn part way to allow a seal 7 to be placed across one corner of the package thereby sealing the package while the vacuum is being drawn, insuring that the vacuum is maintained within the package until it is sealed. The package alternately may be sealed in a vacuum chamber to provide the vacuum within the package.

The seals 5 and 7 may be made by applying heat at the points to be joined. Several heat sensitive plastics may be sealed by applying varying degrees of heat thereto; however, polyethylene is found to be quite useful. In tests it has been found that polyethylene alone is quite brittle under expansion and does not hold a good vacuum; therefore, a laminate material of polyethylene with a backing of, for example, nylon, a generic term for a series of polyamide resins made by the polymerization of a hexomethylenediamine salt of adipic acid, Mylar, a trademark for a transparent water repellent film of polyethylene terephthalate resin manufactured by E. I. du Pont de Nemours & Co., Teflon, which is a trademark for a plastic consisting of tetrafluoroethylene polymer manufactured by E. I. du Pont de Nemours & Co., or other similar materials may be used. These same materials, with the exception of polyethylene, may be used for the thin film 3 since they have higher temperature characteristics than the polyethylene. By having one layer of the laminate of polyethylene, a seal may be readily made between two sheets of laminate by placing the polyethylene sides together and applying heat. The backing material adds strength and permits a vacuum to be drawn and held within the package. After the semiconductor wafer is encapsulated it is ready for breaking.

Previous to encapsulating the wafer, scribe marks are made on the wafer, along which it is desirable to break the wafer. The scribe marks are usually made orthogonal so that each element or circuit is scribed within a square or rectangular segment. The breaking operation may be performed in an apparatus similar to the one shown in FIG. 2. The apparatus consists essentially of a frame 11 having a roller 10 rotatably mounted thereon. The roller 10 rolls over a resilient surface 32, for example, rubber. The encapsulated wafer is placed in front of the roller and oriented such that the scribed surface faces the breaking pad 32 and the scribed lines are aligned parallel to the axis of the roller. As the roller passes over the encapsulated wafer, the wafer and breaking pad are locally deformed to permit breaking deflection of the wafer. It is this simultaneous combination of breaking freedom and preserved orientation which results in high breaking yield. After the initial roller pass is made, the wafer then is rotated 90° and a second pass is made. It should be noted that the encapsulated wafer may be removed from the breaking apparatus and slightly flexed to visually examine the resulting segments. Should any scribe line remain unbroken, the breaking process may be repeated. Since each individual segment is held in place by the vacuum package, the segments remain in original orientation; therefore, any additional rolling operations will not create a pressure on a segment in a direction different from that which it was originally submitted. The breaking process does not affect the vacuum within the encapsulation and the segments may be stored until needed.

Before the segments are separated it is necessary to adhere the segments to one side of the encapsulation since in the separation process one side of the encapsulation is removed. The package is placed on a heated press as shown in FIG. 3. This press comprises the lower member 17 which is a flat metallic plate having a heater 31 therein. The upper member of the press is comprised of the metallic plate 15 with a resilient member 16 attached thereto. This member 16 may be of any resilient material which will flex under pressure such as, for example, rubber.

The encapsulated wafer is placed upon the face of member 17 of the press with the device side of the wafer up. The two members of the press are moved together to apply slight pressure against the encapsulated wafer thereby causing the individual segments to be forced into the face of the layer 2 due to the pressure applied by the two faces of the press and the heating of the material 2 by heater 31. The rubber facing on member 15 applies even pressure to the individual segments without breaking them, the pressure being sufficient to press the segments gently into the layer 2 as above described. When the encapsulated wafer is removed from the press, the lower layer 2 will cool and the individual segments will adhere thereto in the depressions caused by the pressing operation. The thin film 3 will prevent the segments from adhering to the upper layer 4.

The encapsulated semiconductor segments are now placed on a vacuum mold, for example, as shown in FIG. 4. The mold is a cupped-out container 20 having a raised portion 29 in the center thereof. A removable cup-shaped disc 30 resides on the raised portion 29. The recessed portion 28 extends around the inner circumference of the container and has several holes therein, for example, as the one shown at 27 through which the vacuum is created. The retainer ring 21 is hinged to mold 20 at 22 and is clamped down diagonally opposite the hinge 22 and held in place by screw 23 and a knurled nut 24. Retainer ring 21 seals against rubber gasket 25. Extending around and partially embedded in the retaining ring 21 is O-ring 26. The encapsulated segments are placed over the mold 20 and clamped thereon by the retaining member 21. The rubber O-ring 26 and gasket 25 press upon the encapsulation and create a hermetic seal therewith. A sharp blade is then used to cut layer 4 to remove a portion thereof to expose wafer 6. Both the cut-out portion 4a of the layer 4 and the thin film 3 (shown in FIG. 1) are removed exposing the device surface of the individual segments.

Figure 5:
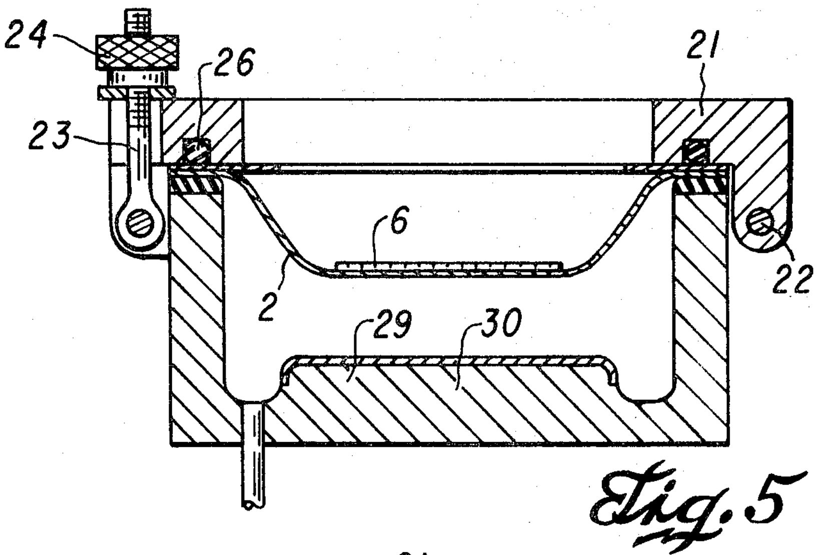
FIG. 5 shows the position of the pliable material after the vacuum forming has commenced.

After the encapsulated semiconductor wafer segments are clamped in place and a top layer of encapsulating material removed, a vacuum is pulled through opening 27 and other similar openings causing the encapsulating material thereto to be pulled downward stretching the material. The material stretched about half way down to the bottom of the vacuum chamber is shown in FIG. 5.

Figure 6:
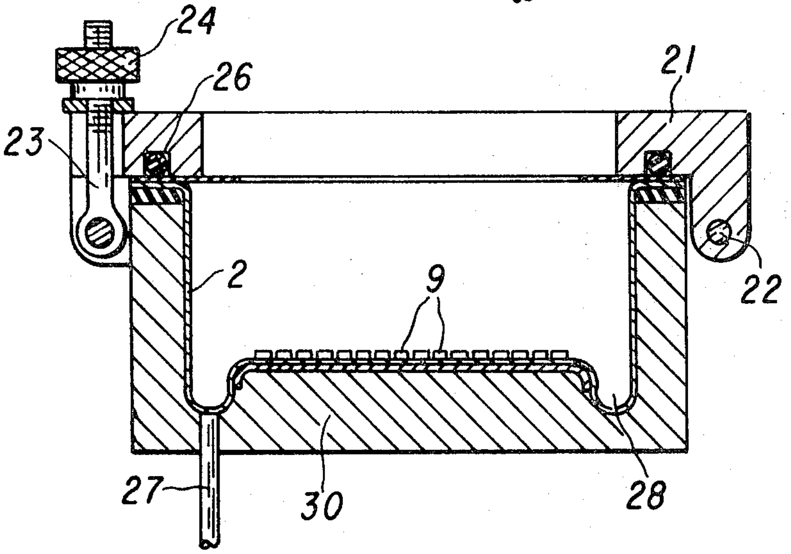
FIG. 6 shows the pliable material fully formed into the vacuum mold with the segments expanded.
Figure 7:
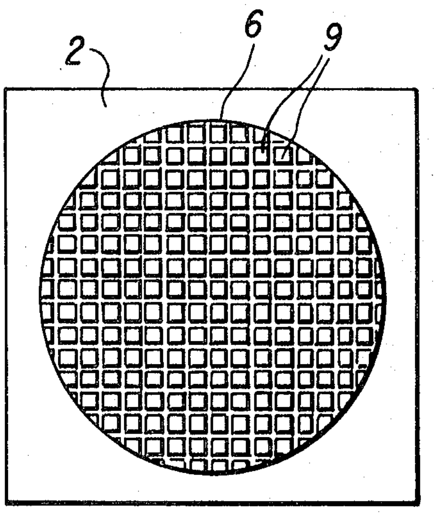
FIG. 7 shows the wafer after the vacuum forming operation with the segments of the wafer separated.

After a vacuum has been created within the chamber, the layer 2 will be pulled down and against the inside of the vacuum chamber approximately as shown in FIG. 6. Disc 30 may have a piece of tape adhered thereto with a pressure sensitive adhesive on the upper side so that layer 2 will adhere to the disc. To remove layer 2, or at least a portion thereof, and the separated segments, layer 2 is cut around the circumference of the disc 30 in groove 28. Disc 30 then may be removed with the layer 2 and segments 9 adhering thereto. The separated segments are illustrated in FIG. 7.

In some instances it may be desirable to apply heat to the layer 2 during the stretching process in which the segments are separated. This may be done by applying radiant heat above the insulating layer or by flowing a hot gas into the vacuum chamber during the forming process. The application of heat to the layer 2 aids in the stretching of the layer 2 during the evacuation process.

Although the present invention has been shown and illustrated in terms of a specific preferred embodiment, it will be apparent that changes and modifications are possible without departing from the spirit and scope of the invention as defined in the appended claims.

What is claimed is:

1. A method for separating the segments of a substrate which has been scribed to identify the individual segments and sealed between two sheets of non-porous pliable material, comprising the steps of breaking said substrate into segments, adhering said segments to one of said two sheets of pliable material, and vacuum forming to expand said sheet of pliable material whereby said segments are separated while maintaining the relative position of each segment in relation to the other segments.

2. The method according to claim 1 wherein said segments are adhered to one of said sheets of pliable material by placing said enclosed segments between the faces of a heated press and forcing said segment into one of said sheets of pliable material.

3. The method according to claim 1 wherein said segments are vacuum sealed between said sheets of pliable material.

4. The method according to claim 1 wherein a thin film of material is placed between said substrate and one of said sheets of pliable material.

5. The method according to claim 4 wherein said film of material and the sheet of pliable material adjacent thereto are removed before the remaining pliable material to which the segments are adhered is expanded.

6. The method according to claim 1 wherein said pliable material is heated during the forming process.

7. The method for separating the segments of a semiconductor wafer which has been scribed to identify the individual segments on which one or more devices or circuits have been formed and has been sealed between two sheets of non-porous heat sensitive pliable material, comprising the steps of breaking said wafer along said scribe lines to separate into segments, adhering said segments to one of said sheets of pliable material and vacuum forming to expand the sheet of pliable material to which said segments are adhered to separate said segments while maintaining the relative position of each segment in relation to the others.

8. The method according to claim 7 wherein a thin film of material is placed between said wafer and one of said two sheets of heat sensitive material, said thin film having a higher softening temperature than said sheet of heat sensitive material.

9. The method according to claim 1 wherein said pliable material is vacuum formed against a surface to which a pressure sensitive adhesive has been applied whereby said expanded sheet of pliable material adheres thereto maintaining its expanded condition.

10. The method according to claim 7 wherein at least a portion of one of said sheets of pliable material and said thin film is removed prior to said expanding step.

References Cited

UNITED STATES PATENTS

| | | | |
|---|---|---|---|
| 1,936,980 | 11/1933 | Hooton | 156—300 |
| 3,448,510 | 6/1969 | Bippus et al. | 29—413 |
| 3,446,686 | 5/1969 | Butler et al. | 156—224 |

ROBERT F. STAHL, Primary Examiner

U.S. Cl. X.R.

29—413, 423, 583; 53—21; 225—93